US012044215B2

(12) United States Patent
Gollnick et al.

(10) Patent No.: US 12,044,215 B2
(45) Date of Patent: Jul. 23, 2024

(54) CONTROLLING THE OPERATION OF PLURAL WIND TURBINES

(71) Applicant: Siemens Gamesa Renewable Energy A/S, Brande (DK)

(72) Inventors: Bert Gollnick, Hamburg (DE); Xavier Vives Jaume, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/277,501

(22) PCT Filed: Feb. 17, 2022

(86) PCT No.: PCT/EP2022/053922
§ 371 (c)(1),
(2) Date: Aug. 16, 2023

(87) PCT Pub. No.: WO2022/184449
PCT Pub. Date: Sep. 9, 2022

(65) Prior Publication Data
US 2024/0125298 A1    Apr. 18, 2024

(30) Foreign Application Priority Data
Mar. 1, 2021  (EP) ...................... 21159950

(51) Int. Cl.
*F03D 7/04*      (2006.01)
*F03D 7/02*      (2006.01)

(52) U.S. Cl.
CPC ............ *F03D 7/049* (2023.08); *F03D 7/028* (2013.01); *F05B 2270/1033* (2013.01); *F05B 2270/32* (2013.01)

(58) Field of Classification Search
CPC .. F03D 7/049; F03D 7/028; F05B 2270/1033; F05B 2270/32
See application file for complete search history.

(56) References Cited

U.S. PATENT DOCUMENTS 10,612,519 B2 *   4/2020   Franke .................. F03D 7/0204
10,975,844 B2 *   4/2021   Spruce .................... F03D 17/00
(Continued)

OTHER PUBLICATIONS

International Search Report & Written Opinion for PCT/EP2022/053922 issued on May 24, 2022.

*Primary Examiner* — Eldon T Brockman
(74) *Attorney, Agent, or Firm* — Schmeiser, Olsen & Watts LLP

(57) ABSTRACT

A method of controlling plural wind turbines is provided, wherein each wind turbine is operable in different operating modes, wherein operating parameters and/or operating features are set differently in the different operating modes. For at least a first of the plural wind turbines, at least some of the different operating modes have a different impact on a residual lifetime of at least a second of the plural wind turbines. In embodiments, the method includes providing at least one candidate operating scheme and estimating a residual lifetime and/or at least one optimization parameter. Estimating of the residual lifetime and/or the optimization parameter considers the impact of the operating mode of the first wind turbine specified in the candidate operating scheme on the residual lifetime of the second wind turbine. The plural wind turbines are then operated in accordance with an operating scheme selected from the candidate operating schemes.

15 Claims, 6 Drawing Sheets

(56) References Cited

U.S. PATENT DOCUMENTS

| | | | | |
|---|---|---|---|---|
| 2007/0124025 A1* | 5/2007 | Schram | F03D 7/0276 | |
| | | | 290/44 | |
| 2013/0103202 A1* | 4/2013 | Bowyer | F03D 7/048 | |
| | | | 700/275 | |
| 2013/0166082 A1* | 6/2013 | Ambekar | G05B 13/041 | |
| | | | 700/287 | |
| 2013/0300115 A1* | 11/2013 | Seem | F03D 7/048 | |
| | | | 290/44 | |
| 2015/0050144 A1* | 2/2015 | Westergaard | F03D 7/0204 | |
| | | | 416/1 | |
| 2016/0146190 A1* | 5/2016 | Ravindra | F03D 9/257 | |
| | | | 290/44 | |
| 2017/0284368 A1 | 10/2017 | Franke et al. | | |
| 2018/0171979 A1 | 6/2018 | Spruce | | |

\* cited by examiner

CONTROLLING THE OPERATION OF PLURAL WIND TURBINES

CROSS-REFERENCE TO RELATED APPLICATIONS

This application claims priority to PCT Application No. PCT/EP2022/053922, having a filing date of Feb. 17, 2022, which claims priority to EP Application No. 21159950.1, having a filing date of Mar. 1, 2021, the entire contents both of which are hereby incorporated by reference.

FIELD OF TECHNOLOGY

The following relates to a method of controlling the operation of plural wind turbines, each of which is operable in different operating modes. The following further relates to a respective control system and to a computer program for controlling the operation of plural wind turbines.

BACKGROUND

The use of wind energy is proliferating. Wind turbines are being installed at different locations throughout the world and are exposed to different environmental conditions. This also applies to the different wind turbines within a wind farm, which may be exposed to significantly different fatigue loads. The wind turbines of a wind farm are generally of the same type and model, whereas the conditions the turbines experience are very different, so that after several years of operation, the residual lifetime of the wind turbines in the same wind farm can be quite different.

This may result in a reduced energy output, since some wind turbines may fail earlier than others, or may need to be serviced excessively. On the other hand, the potential of other wind turbines may not fully be exploited. It is desirable to avoid such situation and to improve the energy production by such wind farms while avoiding that some wind turbines reach their end of life prematurely.

The document US 2018/0171979 A1 describes a control schedule for a wind turbine in which a maximum power level is varied until an estimated future fatigue lifetime consumed by the wind turbine is sufficient to allow a target minimum wind turbine life to be reached.

The document US 2017/0284368 A1 describes the operation of a yaw drive of an upstream wind turbine to minimize a wake effect on a downstream turbine. If the power required to operate the yaw drive exceeds the gain in power production expected by changing the yaw angle, the change is not performed.

SUMMARY

An aspect relates to the operation of wind turbines and in particular to avoid such large differences in a lifetime or to increase the energy production.

According to an embodiment of the present invention, a method of controlling the operation of plural wind turbines is provided. Each wind turbine is operable in different operating modes, wherein one or more operating parameters and/or operating features of the wind turbine are set differently in the different operating modes. For at least a first of the plural wind turbines, at least some of the different operating modes in which the first wind turbine is operable have a different impact on lifetime consumption and thus on a residual lifetime of at least a second of the plural wind turbines. In embodiments, the method comprises providing at least one candidate operating scheme, wherein each operating scheme specifies an operating mode for each of the plural wind turbines; estimating a residual lifetime and/or at least one optimization parameter for operation of the plural wind turbines in accordance with the provided candidate operating scheme, wherein estimating the optimization parameter comprises estimating, for a predetermined future period of time, at least one of energy production or revenue generated by operating the plural wind turbines in the candidate operating scheme. The estimating of the residual lifetime and/or the optimization parameter considers the impact of the operating mode of the first wind turbine (which is specified in the candidate operating scheme) on the residual lifetime of the second wind turbine. In embodiments, the method further includes selecting an operating scheme from the at least one candidate operating scheme for which the estimated residual lifetime and/or the optimization parameter fulfills a predetermined criterion and operating the plural wind turbines in accordance with the selected operating scheme.

Such control method accordingly takes into account the effect that the operation of some wind turbines has on the lifetime of other wind turbines, so that an overall operating scheme can be obtained that meets a predefined criterion, such as that the residual lifetime for all wind turbines is above a limit or that the energy production of the plural wind turbines is maximized. For example, a target residual lifetime may be set as the predetermined criterion, and the candidate operating scheme may be selected for which the residual lifetimes of the individual wind turbines deviate the least from this target. This in turn leads to an increase in the energy production of the plural wind turbines, since the lifetime of some wind turbines may be increased, whereas other wind turbines may be operated at higher load to decrease the residual lifetime towards such target. As another example, the criterion may be the maximization of the energy production over the predetermined period of time, which also depends on the lifetime of the individual wind turbines, since wind turbines the residual life of which has expired can no longer contribute to the energy production. The energy production of a wind farm in which the wind turbines experiences significantly different loads can thus be maximized. Both wind turbines experiencing higher fatigue loads can contribute more to the energy production by prolonging the residual lifetime of these wind turbines, and wind turbines experiencing only smaller fatigue loads can contribute to increase energy production by operating these wind turbines closer to or above their limits, since these wind turbines have excess residual lifetime and can thus be driven more aggressively. In an embodiment, in the candidate operating scheme, the operating mode for at least one wind turbine is different from a current operating mode of the respective wind turbine (this may apply at least to the first wind turbine, to all wind turbines that qualify as 'first wind turbine', or to each of the plural wind turbines).

It should be clear that the method may be performed for plural candidate operating schemes (e.g., two or more), and that the estimation may be part of an iterative process or an optimization process for plural of such candidate operating schemes. Different candidate operating schemes may define different operating modes for the plural wind turbines. If the criterion is not fulfilled, the method may be repeated for a different candidate operating scheme, or an operator may be informed, and the criterion may be adjusted or relaxed. The criterion of residual lifetime and optimization parameter can certainly be combined, such as requiring all wind turbines to have a minimum residual lifetime (e.g., determined by a de-commissioning date for the plural wind turbines), which can be considered as a boundary condition, and a maximization of the energy production or revenue. Revenue refers to the revenue obtained by sale of the produced energy, which generally can be calculated as electricity price times produced electrical energy, and which may thus be considered as an alternative to the optimization parameter of energy production. As an alternative to revenue, power demand satisfaction of a power demand from a power grid to which the wind turbines are coupled may be estimated as an optimization parameter (the electricity price is often proportional to the power demand). By maximizing power demand satisfaction as an optimization criterion (minimizing deviations between power produced by the wind turbines and the power demand), an improved grid stability may be achieved, as the required power is supplied into the grid.

The first wind turbine may for example be operable in a first mode having a first impact on the residual lifetime of the second wind turbine and a second mode having a different impact on the residual lifetime of the second wind turbine, for example by causing less turbulences at the location of the second wind turbine which may be in the wake of the first wind turbine, e.g. by defining a power curtailment, and or by including the activation of an operating feature such as wake-steering. Different candidate operating schemes may accordingly include different operating modes of the first wind turbine, thus resulting in a different impact on the residual lifetime of the second wind turbine, which is considered in the estimation. The operating modes of the wind turbines may also include a baseline operating mode, which corresponds to a standard operation of the wind turbine without curtailment or the activation of specific operating features. It should be clear that some of the plural wind turbines may influence the lifetime of others, in particular of the ones in the wake of these first mentioned wind turbines, while others may not. In any case, since the mutual influence on lifetime is considered in the selection of the operating scheme for the plural wind turbines, the lifetime of the individual wind turbines can be aligned and the energy production of the plural wind turbines can be increased.

In an embodiment, fulfillment of the predetermined criterion includes at least one of the estimated residual lifetime for each of the plural wind turbines reaches or exceeds a predetermined minimum lifetime, in particular a de-commissioning date for the plural wind turbines; the estimated optimization parameter is above a predetermined threshold; or the estimated optimization parameter is larger than the optimization parameter estimated for other candidate operating schemes, which may for example correspond to a maximization of the energy production or revenue for the different candidate operating schemes. As mentioned above, these criteria can be combined, for example by maximizing energy production while ensuring a minimum lifetime of all wind turbines.

In an embodiment, the method further comprises estimating an actual residual lifetime for each of the plural wind turbines; identifying wind turbines of the plural wind turbines for which the estimated actual residual lifetime is lower than a predetermined threshold, or identifying a number of wind turbines having the lowest actual residual lifetime; and determining the at least one candidate operating scheme by selecting the operating mode of one or more first wind turbines (the operation of which has an impact on the lifetime of the identified wind turbines, i.e. they are 'first wind turbines' within the meaning of claim 1), such that the residual lifetime of the identified wind turbines is increased.

For example, operating modes may be selected in the candidate operating scheme for the one or more first wind turbines that reduce wind turbulences at the identified wind turbines. Power curtailment, wake-steering or the like may be employed for the first wind turbines in order to reduce turbulence.

The one or more first wind turbines (which have an impact on the lifetime of the identified wind turbines) may be neighbors to the identified wind turbines and/or are arranged upstream of the identified wind turbines, with respect to a predominant wind direction at the location of the first wind turbines (in other words, the identified wind turbines are in the wake of or are downstream of the first wind turbines; they may thus correspond to the second wind turbines mentioned above). For example, the wind turbines may be identified that have an actual residual lifetime that is lower than a predetermined de-commissioning date, or one, two, three, four, five or more wind turbines with the lowest actual residual lifetime may be identified.

Based on the actual residual lifetime estimated for the plural wind turbines, the wind turbines may be identified for which the estimated actual residual lifetime is higher than a predetermined threshold, or a number of wind turbines having the highest lifetime may be identified. For these wind turbines, the candidate operating scheme may be determined such that operating mode for such identified wind turbine increases the energy production of the respective wind turbine at the expense of the lifetime of the respective wind turbine. Again, the threshold may be a de-commissioning date, and the energy output of these wind turbines can be increased if it is ensured that the residual lifetime is not lowered below the de-commissioning date. Energy production can thus be increased.

The actual residual lifetime of each of the plural wind turbines may for example be estimated based on a current operating mode of the respective wind turbine in which the wind turbine is currently operating, which may be a baseline operating mode, or which may be an operating mode determined in accordance with the previous application of the present method. Increase in the energy production thus relates to this current operation.

In an exemplary implementation, the candidate and/or the selected operating scheme may include an operating mode for each of the first and second wind turbines that is selected such that the lifetime of the second wind turbine is increased at the expense of the lifetime and/or energy production of the first wind turbine. This may however occur under the additional criterion that the residual lifetime of the first wind turbines is kept larger than a predefined minimum lifetime, such as the de-commissioning date. Additionally, the candidate and/or selected operating scheme may include an operating mode for wind turbines having an actual residual lifetime above a predetermined threshold that increases the energy production of these wind turbines at the expense of the residual lifetime of these wind turbines. Such operating schemes result in an overall improved lifetime and energy production of the plural wind turbines.

The second wind turbine may in particular be positioned in the wake of the first wind turbine, it may in particular be arranged downstream of the first wind turbine with respect to a predominant wind direction. In the wake means that the second wind turbine experiences turbulences generated by the first wind turbine, or by a group of first wind turbines.

The predetermined future period of time may be a period of time until the de-commissioning of at least one of the first and second wind turbines, for example of the plural wind turbines. A respective de-commissioning date may be predefined at a future point in time. The future period of time may be more than one week, more than one month, more than 3 months, more than 6 months, or even more than one year.

In an embodiment, the operating mode for a wind turbine determines at least one of an activation state of a peak shaving operating feature, the activation of which changes an operating curve using which a wind turbine controller operates the wind turbine, the operating curve determining wind turbine settings, in particular rotor speed and pitch, in dependence on wind speed; a curtailment of the power output of the wind turbine (which may be performed as part of the activation of a respective operating feature, such as ACS); an activation state of a wake steering operating feature; an operating parameter of a wake steering operating feature; an activation state and/or operating parameters of a (extended) power boost operating feature, the activation of which increases the power output of the wind turbine by increasing the power limit of the wind turbine under predetermined wind conditions; an activation state of a high wind ride through, HWRT, operating feature the activation of which performs a load based reduction of the output power of the wind turbine in predetermined wind conditions; an activation state of a power curve upgrade kit, PCUK, operating feature, the activation of which modifies a control function of a wind turbine controller, in particular the pitch angle control, in dependence on hardware modifications installed on the wind turbine, in particular on rotor blades thereof; and an activation state of an adaptive control system, ACS, operating feature that reduces the output power of the wind turbine if turbulences above a threshold are determined at the wind turbine.

By these operating parameters and/or operating features of the wind turbine, the power production and the residual lifetime of the respective wind turbine can be controlled, for example by either increasing power output at the expense of lifetime, or by decreasing the power output to increase the lifetime. At the same time, these operating features also allow the controlling of the influence that the respective wind turbine has on the lifetime of other wind turbines which are located in their wake, for example by reducing the turbulences when providing wake-steering or when reducing the own power output by power curtailment. These operating features therefore allow the selection of an operating scheme that optimizes the energy production by the plural wind turbines, and that in particular ensures that the lifetime of all the wind turbines does not expire prior to a defined point in time, such as the de-commissioning date of the plural wind turbines. For example, at least two, three, four, five or more of the mentioned operating features may be defined in the operating mode for each wind turbine (for example the activation state of these operating features may be defined). A candidate operating scheme may define the activation states of at least two different operating features of the wind turbines. As an example, a candidate operating scheme may specify an operating mode for a wind turbine in which one or more overrating features are activated, and may specify an operating mode for another wind turbine in which one or more de-rating features are activated.

In an embodiment, at least the activation state of a wake-steering feature, and optionally further the curtailment of the power output are defined in the candidate operating scheme. In an embodiment, activation state of peak-shaving and of power boost is also defined in the candidate operating scheme. A significant adjustment of lifetime and power output is already achievable by these operating features.

The at least one candidate operating scheme may comprise plural different candidate operating schemes, and the residual lifetime and/or the optimization parameter, respectively, may be estimated for each of the plural different candidate operating schemes. This may for example be performed as part of an optimization algorithm or an iterative process that changes in each step one or more operating modes of the respective candidate operating scheme, which may for example be performed to find the operating scheme providing the maximum energy production or revenue.

The at least one candidate operating scheme may be determined based on a priori knowledge on the impact of operating modes of the first wind turbine on the lifetime of the second wind turbine. Such knowledge may for example include that some operating modes, which for example include the activation of a wake-steering feature or power curtailment, will lead to a decrease in turbulences experienced by downstream wind turbines, thereby positively affecting their lifetime. Likewise, a priori knowledge regarding the different operating modes may be used for selecting an operating mode of a wind turbine that has excess residual lifetime in order to increase the energy production thereof, for example by activating a power boost feature or the like in the respective operating mode. Using the a priori knowledge, the candidate operating scheme may thus already be configured such that the estimation shows that the predetermined criterion is met, for example such that all wind turbines have a residual lifetime exceeding a threshold corresponding to a minimum lifetime. No further candidate operating schemes may then need to be tested.

Such a priori knowledge may likewise be used when using a plurality of different candidate operating schemes, for example by varying the operating modes in the candidate operating schemes only in such way that they contribute to the desired outcome, e.g. by activating different combinations of operating features that have a positive effect on the lifetime of a wind turbine for which the lifetime is to be increased (e.g. de-rating features), or by activating different combinations of operating features that increase the power output at the expense of lifetime for a wind turbine for which the power output is to be increased (e.g. overrating features).

In any case, if none of the plural different operating schemes fulfills the predetermined criterion, further additional candidate operating schemes may be considered, or the criterion may be adapted by for example lowering a respective threshold or relaxing respective requirements, such as on the lifetime or the minimum energy production.

In an exemplary implementation, the estimating of the residual lifetime and/or of the optimization parameter is performed repeatedly for plural different candidate operating schemes, wherein the candidate operating scheme is selected for which the optimization parameter reaches the highest value. Such optimization may be performed by using one of the well-known optimization algorithms that maximizes the optimization parameter by varying the operating modes of the plural wind turbines in the candidate operating schemes, and may for example include an iterative process that changes the wind turbine operating modes of the candidate operating scheme in each iteration until the desired optimum is reached.

In the estimation of the optimization parameter, periods of time that are further away from a current point in time may be weighted lower than periods of time that are closer to a current point in time. Accordingly, the estimation of the optimization parameter may consider that there is a higher uncertainty involved in energy production in the further away future, for example due to changes in the environmental conditions, damage to the wind turbine or the like.

The estimation of the residual lifetime may be performed for each wind turbine on a component level for the different components of the respective wind turbine. The effect that the different operating modes have on the different components of the wind turbine, such as on the blades, the gearbox, the bearings, the generator and the like, may be considered individually so that the residual lifetime can be estimated accurately.

The estimation of the residual lifetime and/or the optimization parameter may be based on a simulation that employs engineering models of the plural wind turbines. An efficient estimation that is sufficiently accurate may thus be achieved. It may also use trained models that use training data, e.g., statistical data, for predicting lifetime and energy production based on the operating mode and estimated future environmental conditions. The estimation may in particular employ estimated or predicted wind conditions for a future period of time, which can for example be based on a past sample wind distribution.

The plural wind turbines may include a first group of wind turbines which includes the first wind turbine, and a second group of wind turbines which includes the second wind turbine. The second group may be arranged downstream of the first group with respect to a predominant wind direction at the location of the first and second groups. For example, the second group may be a wind farm that is located downstream of the first wind farm with respect to the predominant wind direction. An operating scheme may for example be selected in such situation that reduces the power output (power curtailment) of the first group of wind turbines, thereby reducing the turbulences to which the second group of wind turbines is exposed. The lifetime and the total energy production of the second group of wind turbines may thus be increased significantly, which may result in an overall increased energy production of the two groups of wind turbines in combination.

The respective method may be performed repeatedly during the residual lifetime of the plural wind turbines. Accordingly, after a respective operating scheme has been selected and the wind turbines operate according, to the selected operating scheme, the method may be repeated in order to account for changes in the environmental conditions and in the condition of one or more of the plural wind turbines. In embodiments, the method may for example be repeated weekly, monthly, quarter-or semi-annularly or annularly.

In embodiments, the method may be performed automatically by the control system. The user may only specify the criterion to be met by the optimization, e.g., whether a minimum lifetime is to be achieved, energy production is to be maximized or the like. Once this is specified, the control system can then simulate the operation with the one or more candidate operating schemes to determine the candidate operating scheme for which the criterion is fulfilled, e.g., for which the minimum lifetime criterion is met or for which the power production/revenue is maximized.

The estimation of the lifetime of the wind turbines, and in particular of the actual residual lifetime, may be performed according to any known method. It may for example employ sensor measurements from wind turbine sensors, such as sensors measuring the mechanical, thermal and/or electrical loading of wind turbine components, load changes, environmental conditions (wind speed, temperature, humidity) and the like. Historical data, such as a from a fleet of wind turbines of the same type/model may furthermore be employed in such estimation. As respective lifetime estimation methods are known, they will not be explained in greater detail here.

According to a further embodiment of the invention, a control system for controlling the operation of plural wind turbines is provided, wherein each wind turbine is operable in different operating modes under control of the control system. One or more operating parameters and/or operating features of the wind turbine are set differently in the different operating modes. As indicated above, at least some of the different operating modes of at least a first of the plural wind turbines have a different impact on a residual lifetime of at least a second of the plural wind turbines. The control system comprises a processing unit and a memory, the memory storing control instructions which when executed by the processing unit of the control system perform any of the methods described herein above and further below.

By such control system, advantages similar to the ones outlined further above may be achieved.

The control system may for example include a central controller (wind farm controller) configured to be coupled to the wind turbine controllers of the plural wind turbines to provide to the wind turbine controllers control instructions for operating the wind turbine in accordance with the operating mode for comprised in the selected operating scheme for the respective wind turbine. Such wind turbine controllers may also form part of the control system. A de-centralized control system is also conceivable.

According to a further embodiment, a wind farm comprising such control system is provided.

A further embodiment of the invention provides a computer program product (non-transitory computer readable storage medium having instructions, which when executed by a processor, perform actions) for controlling the operation of plural wind turbines, wherein the computer program comprises control instructions which, when executed by a processing unit of a control system that controls the operation of the plural wind turbines, cause the processing unit to perform any of the methods described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
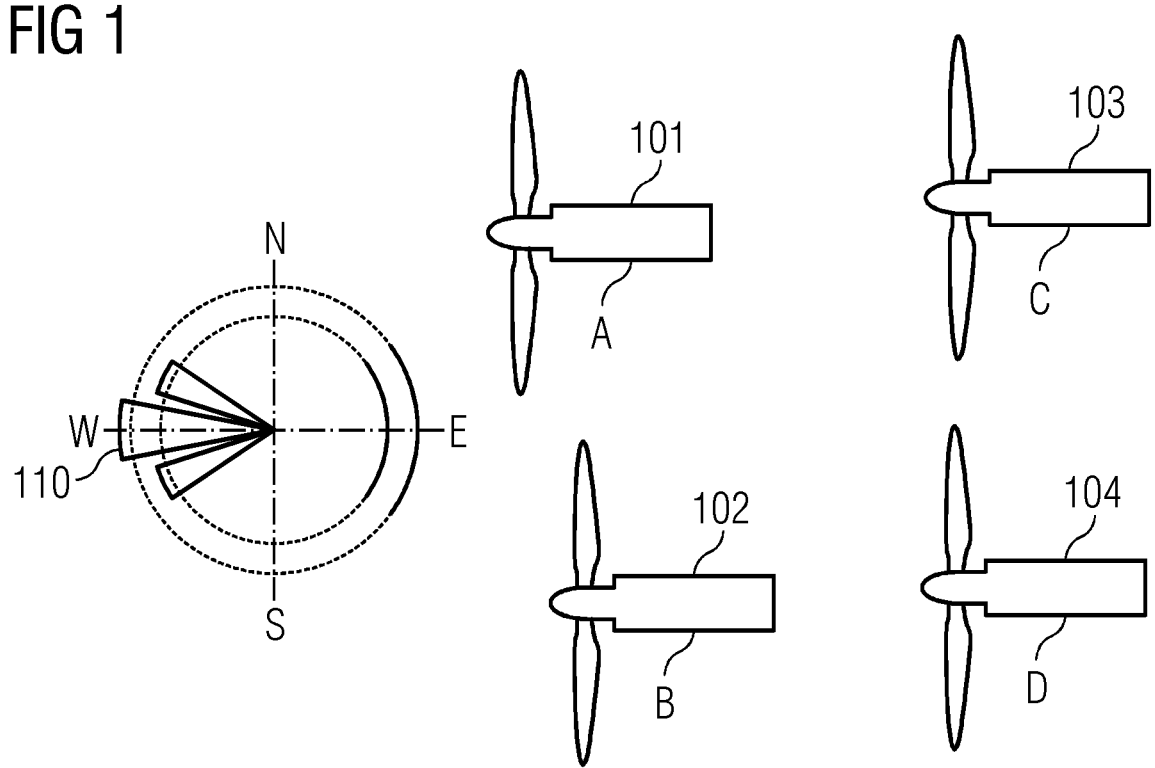
FIG. 1 is a schematic drawing showing plural wind turbines exposed to wind in a predominant wind direction.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Figure 2:
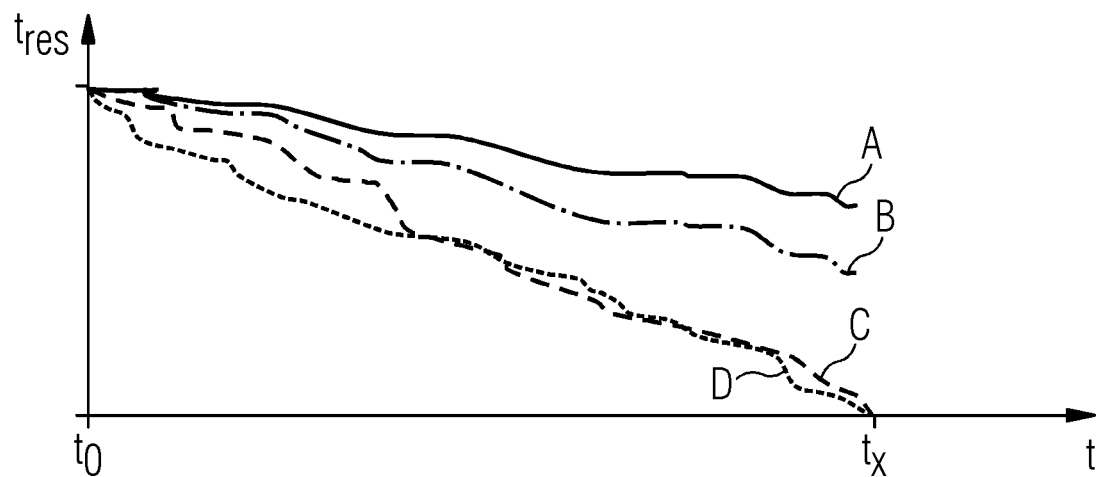
FIG. 2 is a schematic diagram showing the residual lifetime of the wind turbines of FIG. 1.
Figure 3:
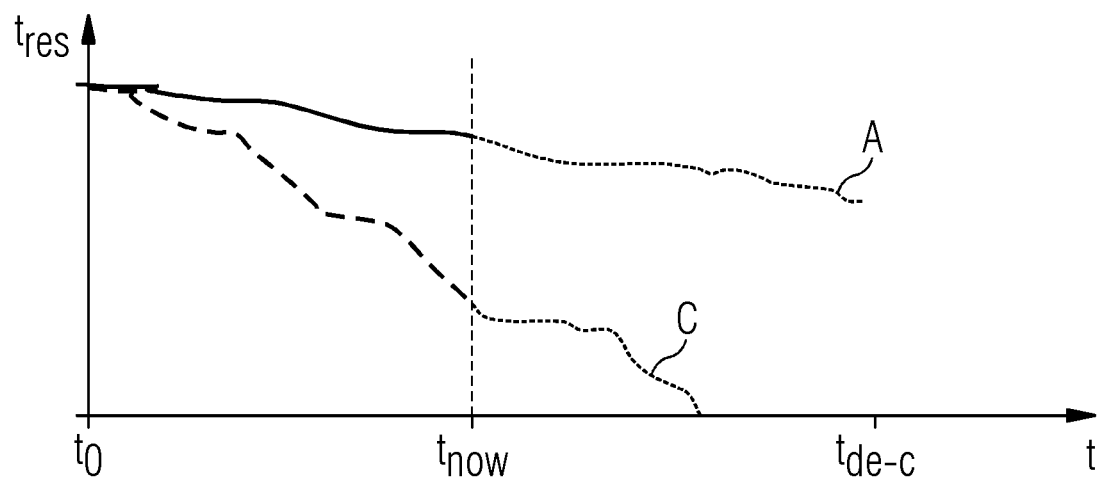
FIG. 3 is a schematic diagram showing the estimated actual residual lifetime and the estimated actual energy production of two exemplary wind turbines.
Figure 3:
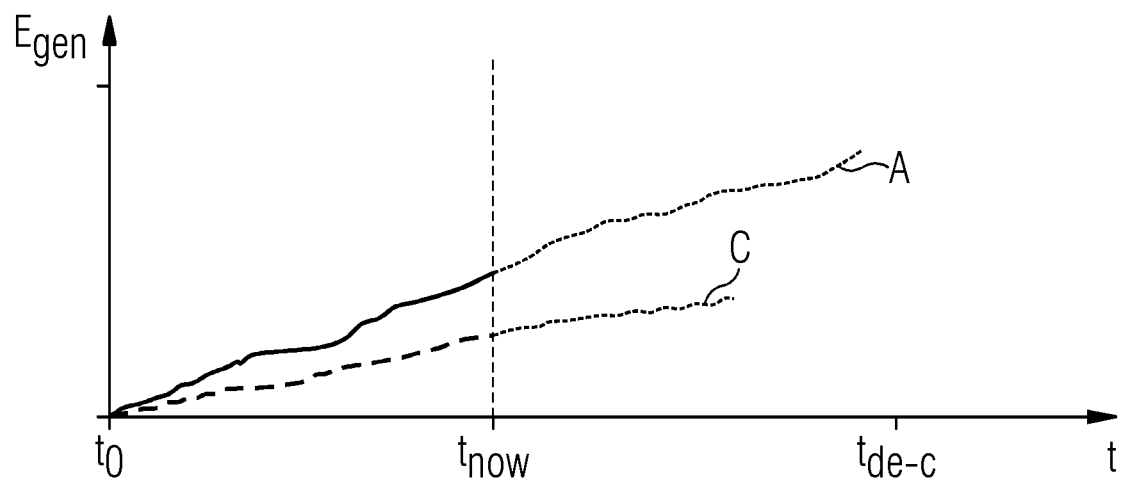

FIG. 1 schematically illustrates four wind turbines 101 to 104 as an example of plural wind turbines. Further, the predominant wind direction prevailing at the location of these wind turbines is illustrated. As can be seen, the wind predominantly comes from the west, so that the wind turbines A and B are upstream of wind turbines C and D, which are accordingly in the wake of wind turbines A and B. Usually, the wind turbines are operated similarly within the same wind farm. However, the wind turbines are exposed to different fatigue loads, which are due to the different wind speeds and turbulences experienced, which are for example higher for the downstream wind turbines C and D. Due to the different loads, the wind turbines have different residual lifetimes, as illustrated in FIG. 2. The wind turbines will generally be de-commissioned at the same point in time. At time $t_x$, the wind turbines C and D may have already reached their end of life due to the higher loading, whereas wind turbines A and B still have a sufficient amount of residual lifetime. If the de-commissioning date for these wind turbines lies at a point in time later than $t_x$, the energy production may be lost while the potential of wind turbines A and B may be partly wasted. This is in more detail illustrated in FIG. 3 for the exemplary wind turbines A and C, which are operated in baseline mode. The upper diagram FIG. 3 illustrates the residual lifetime $t_{res}$ for wind turbines A and C from to (start of operation) to the present point in time ($t_{now}$) and the actual residual lifetime estimated from the current point in time $t_{now}$ for the future (dotted lines). The lower diagram of FIG. 3 illustrates the accumulated energy production from $t_0$ to $t_{now}$ and the actual energy production estimated from the current point in time $t_{now}$ until the end of life (wind turbine C) and until the de-commissioning date $t_{de-c}$ (wind turbine A), the estimation being illustrated as dotted lines. As can be seen, operation of the wind turbines in the conditions illustrated in FIG. 1 results in a higher load and thus reduced lifetime as well as in a lower performance for wind turbine C. Furthermore, as the end of life is reached for turbine C prior to the de-commissioning date $t_{de-c}$, further energy production may be lost. On the other hand, the wind turbine A produces over its lifetime significantly more electrical energy and has at the de-commissioning date $t_{de-c}$ a significantly higher remaining residual lifetime. It is noted that these graphs are provided at an aggregated wind turbine level but may likewise be provided at a component level which allows a more nuanced view on the behavior of the individual wind turbine components.

Embodiments of the present invention now provide an operating scheme that makes better use of the available residual lifetime of wind turbines A and B while furthermore increasing the residual lifetime of the wind turbines C and D, i.e., wind turbines that are affected adversely by turbulences and other effects caused by other wind turbines. The operating modes of the plural wind turbines are in particular adjusted such that the "first" wind turbines (A, B), which affect the lifetime of the "second" (downstream) wind turbines (C, D), are operated such that the lifetime of the downstream wind turbines is increased, for example by reducing turbulences or other control measures, even though this may occur at the expense of lifetime and/or energy production of the upstream wind turbines (A, B).

Figure 4:
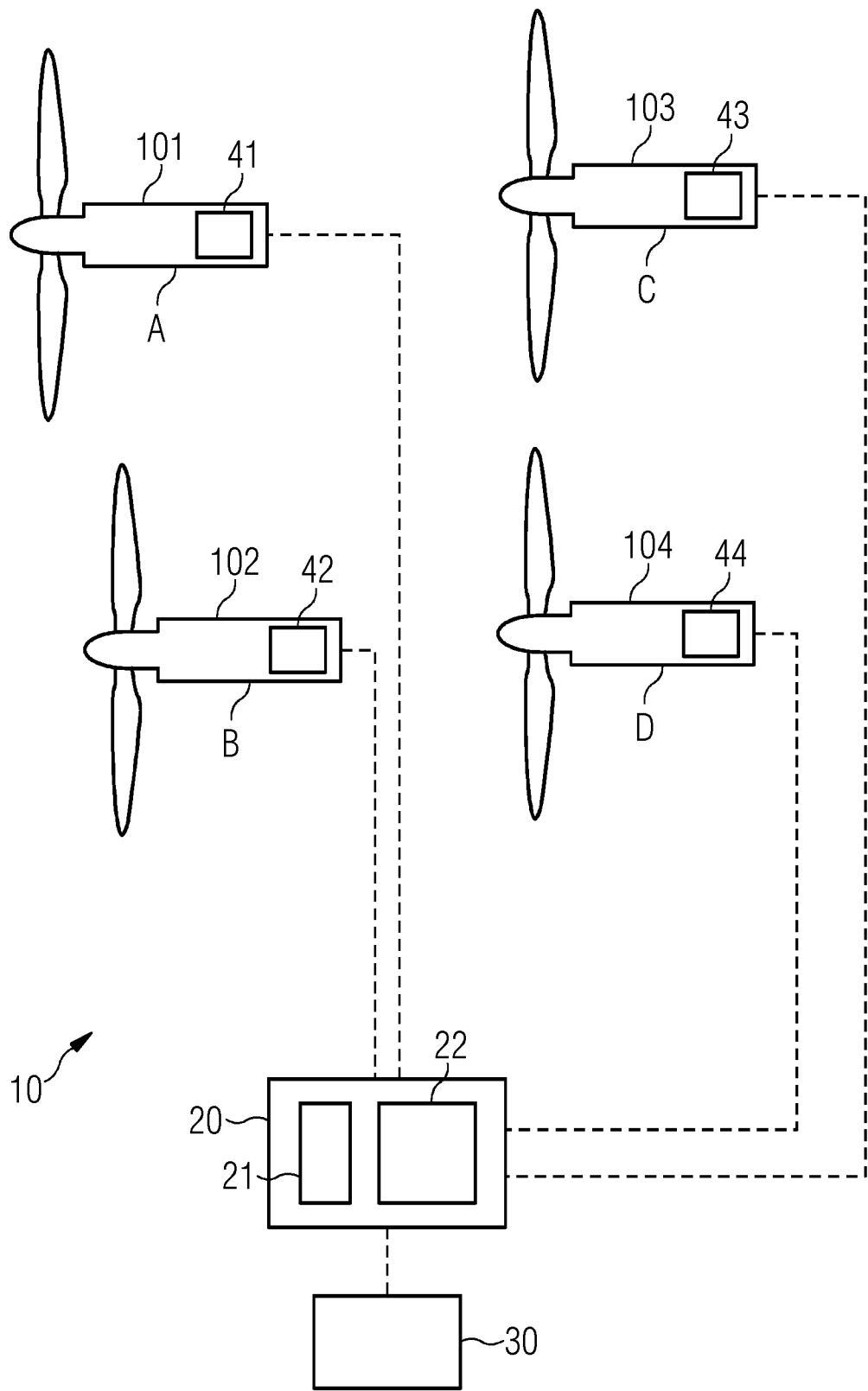
FIG. 4 is a schematic drawing showing a control system for the plural wind turbines according to an embodiment of the invention.

FIG. 4 illustrates schematically a respective control system 10 that can for example include a central (wind farm) controller 20. The controller 20 includes a processing unit 21 and memory 22. The processing unit 21 may include any type of processor, such as a microprocessor, an application specific integrated circuit, a digital signal processor or the like. Memory 22 may include volatile and non-volatile memory, in particular RAM, ROM, FLASH-memory, hard disc drives and the like. Controller 20 includes input and output interfaces for receiving data and for transmitting control data and control commands to the wind turbine controllers 41-44. Such communication may be performed wirelessly or via respective wires, such as a control bus, Ethernet or the like. The control system 10 may include a user interface (e.g., including a display and an input device) via which user input from an operator of the wind turbines can be received.

The memory 22 may store control instructions, which, when executed by the processing unit 21, cause the control system 10 to perform any of the methods described herein. The central controller 20 may for example be configured to set operating parameters and/or turn-on/off operating features of the wind turbines 101 to 104. A respective communication connection towards the respective wind turbine controllers 41, 42, 43, 44 is provided. Each of the wind turbines 101 to 104 is operable in accordance with an operating mode that defines the respective operating parameters and/or operating features. Accordingly, a particular operating feature may be activated in one operating mode and may be deactivated in another different operating mode. The operating parameters and the operating features generally have an impact on the energy production of the respective wind turbine and on the residual lifetime of the respective wind turbine. For example, the performance in terms of energy production of wind turbine can generally be increased at the cost of residual lifetime of this wind turbine, and vice versa. The central controller 20 can thus select a respective operating mode for each individual wind turbine that achieves the desired increase or decrease in residual lifetime or energy production.

The control system 10, in particular central controller 20, is configured to estimate the remaining lifetime and the energy production for each wind turbine, both based on the current operating mode (e.g., baseline) from the current point in time (estimated actual residual lifetime; estimated actual power production) and can further make a respective estimate for other operating modes. Operating modes of the different wind turbines are herein summarized as an operating scheme in accordance with which the central controller 20 operates. In order to arrive at an operating scheme that achieves a desired target, in particular results in the estimated residual lifetime and/or power production or revenue to fulfill a predetermined criterion, the control system 10 estimates at least the residual lifetime and the power production for one or more different candidate operating schemes that define different operating modes for the wind turbines 101 to 104. The candidate operating scheme is selected and used for controlling wind turbines 101 to 104 if the respective criterion is met.

The estimation of the lifetime and the energy production may use data obtained from the wind turbines 101 to 104, such as sensor data related to the respective wind turbine and environmental data, for example wind speed, temperature and the like. It may further employ data from data sources 30, such as historical wind data, predicted wind data, historical data related to a lifetime of the wind turbines or wind turbine components and the like. Performing respective estimations of wind turbine residual lifetime and energy production based on such data sources and based on sensor data from wind turbines is generally known and will not be explained in greater detail here.

The control system 10 now not only considers the impact that the different control modes have on the energy production and the residual lifetime of the respective wind turbine operating in this control mode, but also considers the impact that the operation of the wind turbine has on other wind turbines, in particular on their residual lifetime. The control system 10 can thus align the lifetime of the plural wind turbines for example with respect to a particular date, such as the de-commissioning date, so that the lifetime of wind turbines with low residual lifetime is extended, whereas the energy production potential of wind turbines with a high residual lifetime is better exploited. The overall energy production of the plural wind turbines, for example of one or two wind farms, can thereby be increased.

Figure 5:
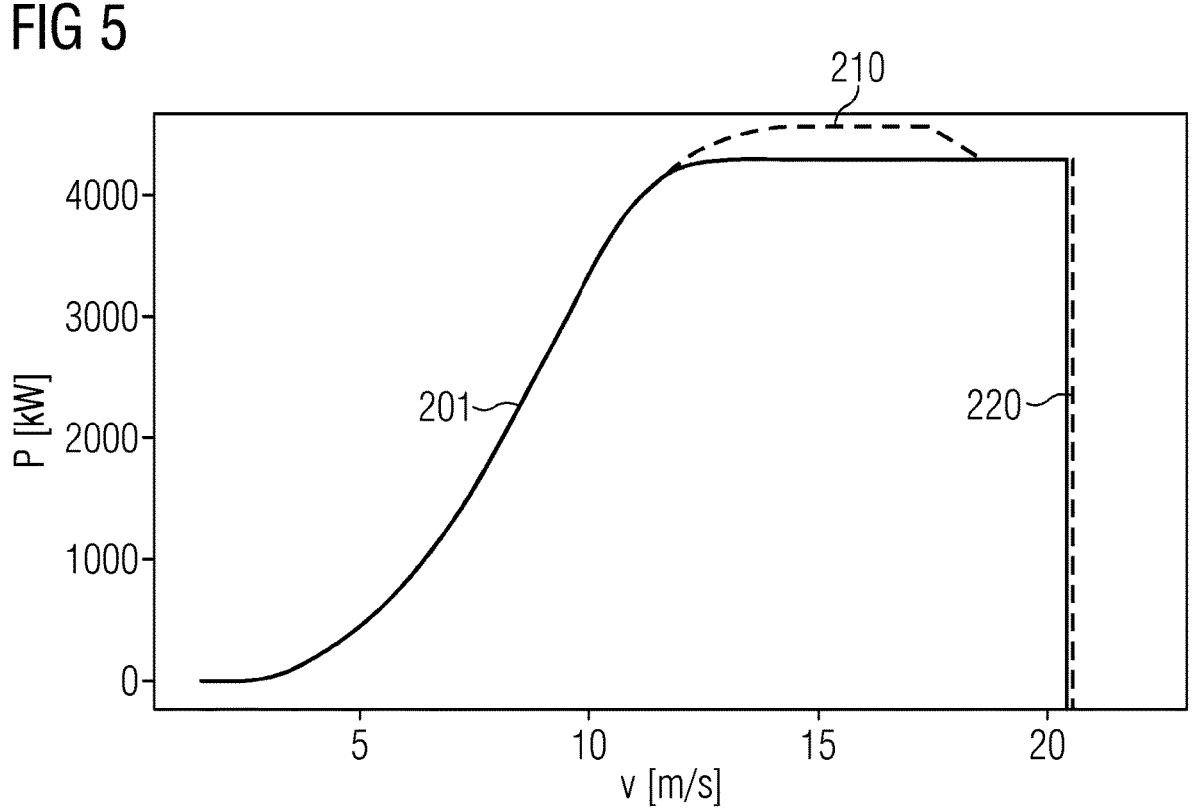
FIG. 5 is a schematic diagram illustrating the effect of an operating mode on the power output of a wind turbine according to an embodiment of the invention.
Figure 6:
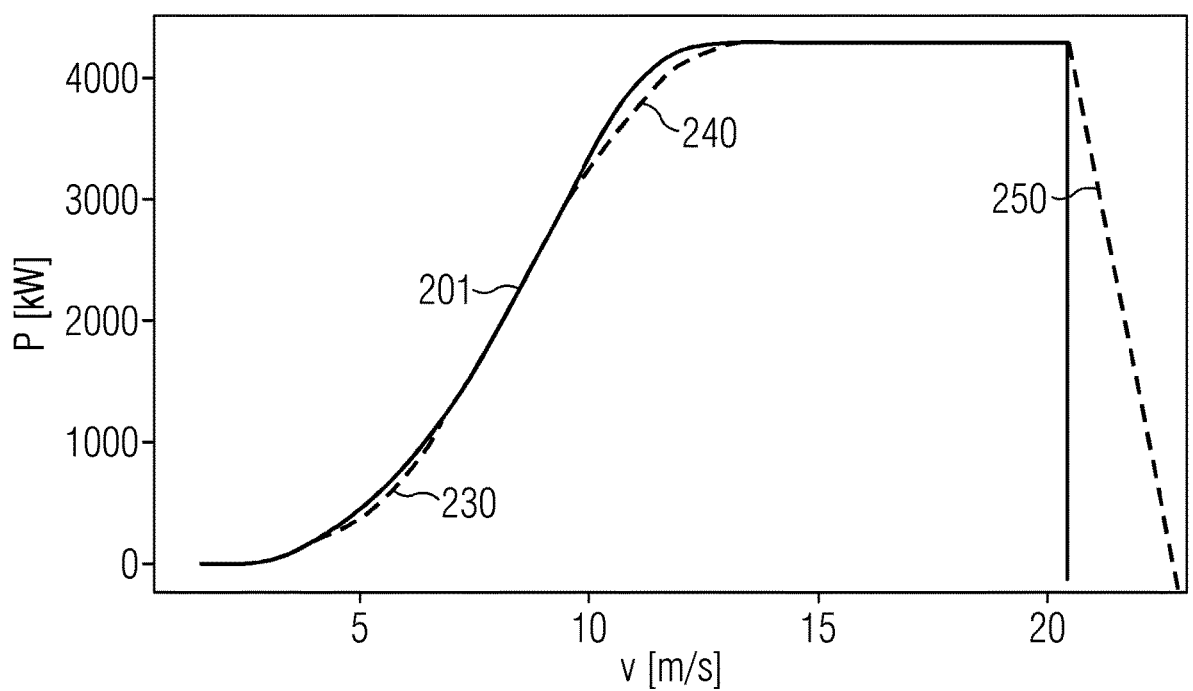
FIG. 6 is a schematic diagram illustrating the effect of an operating mode on the power output of a wind turbine according to an embodiment of the invention.

FIGS. 5 and 6 are diagrams that illustrate examples of respective operating modes in which the wind turbines 101 to 104 may be operated. FIGS. 5 and 6 each show a conventional power curve 201 in accordance with which wind turbine operation is conventionally controlled (solid line; baseline operation), which indicates the electrical power output P of the wind turbine in units of kW for different wind speeds v given in units of m/s. As can be seen in FIG. 5, power production sets in at a minimum wind speed, and the power output remains constant when the rated power output is reached. Above a certain maximum wind speed, the wind turbine is shut down (dashed line 220). FIG. 5 illustrates two operating features. The dashed curve 210 illustrates the operation when a power boost or extended power boost feature is turned on or activated. As can be seen, the power output of the wind turbine is for a certain wind speed range extended beyond the rated power output. Accordingly, more power is produced, whereas the load on the wind turbine components is increased beyond the rated load, thus reducing the wind turbine's lifetime. Furthermore, the dashed part of the curve designated with reference numeral 220 illustrates that a high wind ride-through (HWRT) operating feature is deactivated, so that the power output of the wind turbine is maintained up to the maximum wind speed and then decreased to zero, following the baseline curve. Accordingly, the wind turbine continues to produce the maximum power output up to the maximal wind speed, but is shutoff thereafter, so that the fatigue loading is reduced at higher wind speeds at the expense of energy production. The operating mode illustrated with curve 210 (activated power boost) and possibly an activated HWRT (see below) would for example be an operating mode set for maximum energy production (maximum performance) at the expense of lifetime.

FIG. 6 illustrates the activation/deactivation of different operating features for a similar power curve 201. At 230, the activation of an operating feature that modifies the operating curve 201 in dependence on aerodynamic modifications installed on the wind turbine is illustrated. By such activation, the stresses on the wind turbine are reduced, wherein the lifetime is increased, at the expense of power output. Similarly, the dashed line at 240 illustrates the activation of a peak-shaving operating feature, which modifies the operation curve 201 in dependence on the wind speed. Accordingly, at such higher wind speed, the rotor speed and pitch are set so as to reduce the load on the wind turbine, wherein the power output is reduced as shown in the figure. Again, by activation of this operating feature, the wind turbine's lifetime is increased at the expense of power output. At 250, FIG. 6 illustrates the activation of the HWRT feature. The power output of the wind turbine is maintained until after the maximum wind speed is reached. Above the maximum wind speed, the power output of the wind turbine is slowly ramped down until it decreases to zero. Consequently, the energy production can be increased while only small additional mechanical stresses are experienced by the wind turbine. By the activation of HWRT, the energy production is increased at the expense of residual lifetime. Also, it is avoided that a large number of wind turbines of a wind farm is shut down at the same time. Accordingly, the activation of the operating features 230, 240 illustrated in FIG. 6 extend the lifetime of the wind turbine at the expense of energy production (de-rating features), whereas the activation of HWRT increases energy production at the expense of lifetime (overrating feature). An operating mode involving the dashed parts 230, 240 of the curve of FIG. 6 may be considered a maximum lifetime operating mode in which the lifetime of the wind turbine is increased.

It should be clear that an operating mode of the wind turbine may comprise a different combination of the activation/deactivation of the respective operating features and may furthermore comprise the activation/deactivation of further features and the setting of respective operating parameters. As an example, HWRT may be deactivated in the operating mode of FIG. 6 to arrive at a new operating mode. As another example, power curtailment may be used in an operating mode. This means that the power output of the wind turbine is reduced, for example by reducing generator torque and/or pitching the rotor blades out of the wind. Another example is the activation or deactivation of wake-steering, or the setting of operating parameters of such wake-steering. Wake-steering may be achieved by pointing the wind turbine slightly away from the direction of the oncoming wind, for example by using the yaw drive of the wind turbine. The amount of angular misalignment may for example be set as a parameter of the wake-steering.

It should be clear that the above indicated activation and deactivation of operating features or the setting of operating parameters of the wind turbine can have an effect on downstream wind turbines and on the lifetime of these. These effects are considered when estimating the lifetime of the residual wind turbines and the energy production of the wind turbines in accordance with candidate operating schemes that define an operating mode for each of the wind turbines.

The optimization parameter may also relate to a power demand satisfaction for a power demand from a power grid to which the wind turbines are connected. Power demand satisfaction may be estimated as an alternative to revenue in the method. Electricity price is often proportional to power demand, so that an equivalent optimization may be achieved. The operating scheme will also have an impact on how good the expected future power demand will be met by the power output of the plural wind turbines. For example, if the power demand is expected to be high at specific days of weeks, the energy production for these days may be increased and it may be reduced for other days to be able to satisfy the power demand (by activating/deactivating respective operating features), in particular avoiding over or under production. Satisfying the demand of a power grid results in that the power grid will be operated in a more stable manner. This in turn may avoid that the wind turbines will run into an unstable operating mode, for example low voltage ride through operation. Furthermore, since electricity price is generally high when the demand is high, supplying the electrical energy at times of high demand may also have the side-effect of increasing the revenue for the wind turbine operator.

Figure 7:
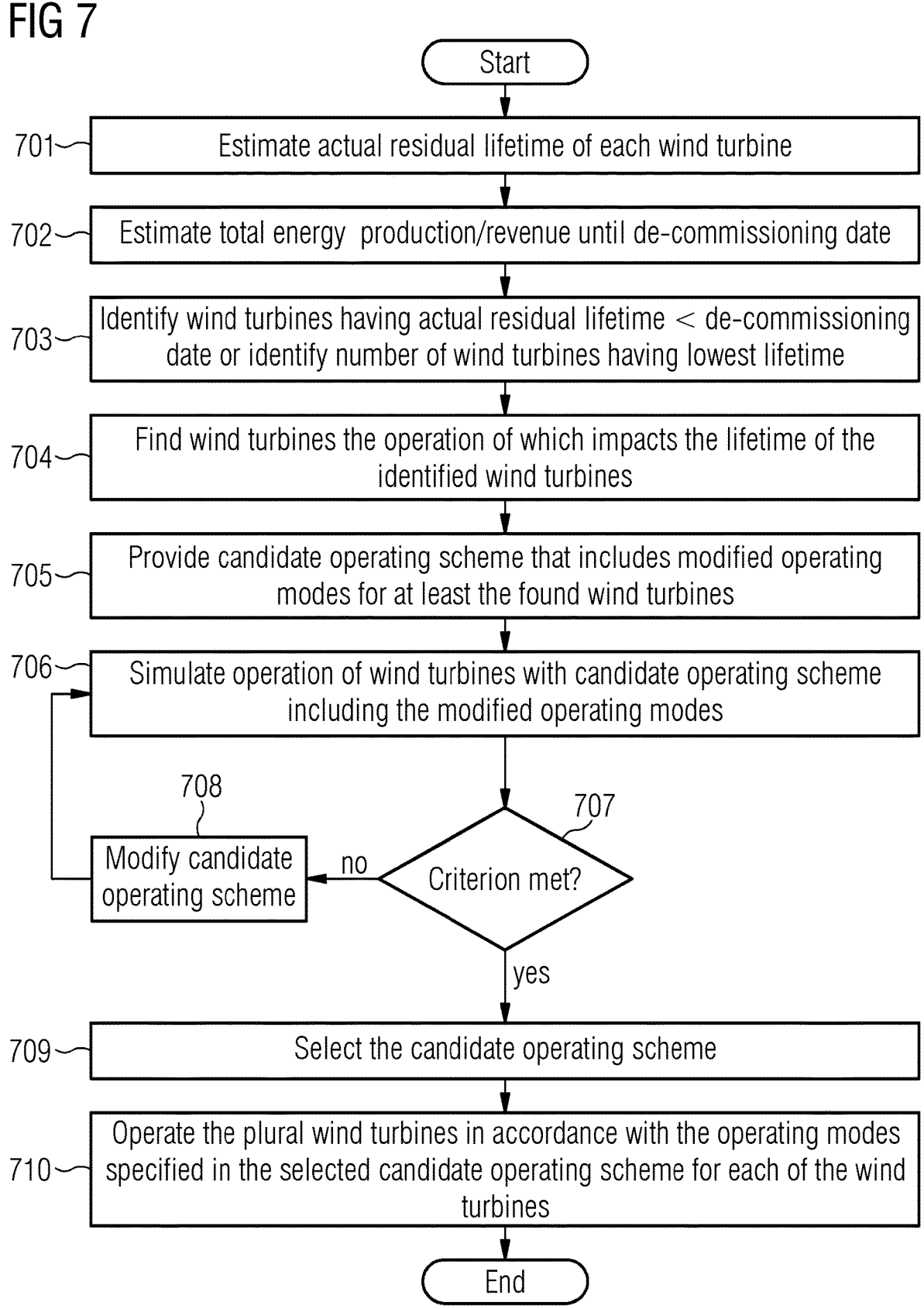
FIG. 7 is a schematic flow diagram illustrating a method according to an embodiment of the invention.

FIG. 7 is a flow-diagram illustrating a method according to an embodiment of the invention. In step 701, for the plural wind turbines 101 to 104, the actual residual lifetime for each wind turbine is estimated, based on the current point in time and the current operating modes of the wind turbines, which may for example be a baseline operating mode. The residual lifetime may in particular be the fatigue lifetime of the wind turbines, i.e., the end of life is predicted. In step 702, the total energy production and/or revenue achieved by the plural wind turbines is estimated for a predetermined future period of time, in particular from the current date until the de-commissioning date. The revenue is generally approximately proportional to the energy production, the proportionality factor being the price of electricity. Accordingly, for the plural wind turbines, it is known after steps 701 and 702 what their lifetime is and what energy production can be expected if these wind turbines continue to operate in their current operating modes. In step 703, wind turbines that have an actual residual lifetime smaller than the de-commissioning date are identified, or a certain number of wind turbines having the lowest lifetime (e.g., one, two, three, four or more wind turbines) are identified. As these wind turbines may stop their power production prior to the de-commissioning date, they may result in an overall reduced power production by the plural wind turbines. To avoid such negative effect, wind turbines are found in step 704, the operation of which impacts the lifetime of the wind turbines identified in step 703. These may for example be wind turbines that are neighbors to the wind turbines identified in step 703, and may in particular be turbines that are located upstream of the identified turbines with respect to a predominant wind direction. The wind turbines selected in step 704 may be positioned such that the wind turbines identified in step 703 are in their wake. In steps 705 to 708, the impact of a modified operation of these neighboring wind turbines found in step 704 on the wind turbines with the shortest lifetime identified in step 703 is evaluated and may in particular be simulated. For this purpose, a candidate operating scheme that includes modified operating modes at least for the wind turbines found in step 704 is provided in step 705. For these "neighboring" wind turbines, an operating mode may for example be included in the candidate operating scheme that modifies one or more operating parameters and/or operating features, which may be done based on a priori knowledge of the effect of such operating features on downstream wind turbines. For example, such modified operating mode may activate a wake-steering feature, or may change an operating parameter of such wake-steering, or may deactivate an operating feature, such as power boost, or may include power curtailment, thus providing downstream wind turbines with a less turbulent airflow.

It should be clear that such candidate operating scheme may comprise modified operating modes also for other wind turbines, and may also select such modified operating modes so as to achieve an optimization target, for example by identifying wind turbines that have an actual residual lifetime determined in step 701 that exceeds the de-commissioning date and by selecting modified operating modes for these wind turbines that include an increased power production for these wind turbines. This may for example involve the activation of a power boost feature and the deactivation of a HWRT feature, as explained above with respect to FIG. 5. The energy production of such wind turbines can accordingly be increased at the expense of their lifetime, which is however not problematic as their lifetime exceeds the de-commissioning date.

In step 706, the operation of the plural wind turbines is simulated for the operation in accordance with the candidate operating scheme which includes the modified operating modes for the plural wind turbines. Such simulation may make use of historical and statistical data, for example on wind speeds, data on how the operation with certain operating modes at certain wind speeds affects the lifetime and the like. Models, such as engineering models, may be employed in such simulation. As an example, trained models may be used that obtain as an input the predicted wind conditions prevailing at the respective location of the wind turbine, taking into account effects caused by neighboring wind turbines, and that, in dependence on the selected operating modes, provide an estimation of the fatigue lifetime of a wind turbine under these conditions, i.e. for a situation in which the wind turbine is operated under these conditions until the end of life. It should be clear that such models used in the simulation may be provided for individual components of the wind turbine, and that the lifetime of such components may be aggregated in order to arrive at the fatigue lifetime of the respective wind turbine. Furthermore, the effect that a wind turbine operating at a certain rotation speed has on the airflow passing this wind turbine is well-known and is considered in the respective models, so that the influence of upstream wind turbines or downstream wind turbines is considered in the simulating of step 706.

Exemplary operating parameters and/or operating features that may be changed when modifying an operating mode for a wind turbine have been explained above with respect to FIGS. 5 and 6. These include activation/deactivation of an (extended) power boost operating feature, HWRT operating feature, peak-shaving operating feature, an aerodynamic add-on operating feature and the like. In an embodiment, the operating mode for the wind turbine specifies at least an activation/deactivation state of a wake-steering operating feature and/or an operating parameter of such wake-steering operating feature. In wake-steering, the wind turbine may for example not be set at the optimal angle with respect to the wind direction, but may be slightly tilted, e.g., via yaw control, so that the direction of the wake caused by wind turbine operation is changed (i.e., the direction of the turbulent airflow is changed). The operating parameter of such yaw steering feature may for example be the angular displacement against the wind direction.

Another modification of the operating mode may be the implementation of power curtailment, in which the rated power output of the wind turbine is reduced, for example by reducing generator torque and/or by changing the pitch angle of the rotor blades to reduce the amount of energy extracted from the wind. Such power curtailment reduces the energy production, but also reduces turbulence in the downstream airflow.

Another modification may be the activation/deactivation of a power curve upgrade kit, PCUK, control feature. Such a feature changes the control function of a wind turbine controller. For example, after deployment, hardware upgrades may be installed on the wind turbine, for example aerodynamic improvements to the blades such as flaps mounted to the trailing edge of the blade root to increase lift or vortex generators, which are applied to alter flow characteristics in the boundary layer, resulting in higher lift. The PCUK control feature modifies the wind turbine control to account for such hardware modifications and to enhance energy production, for example by adjusting the pitch control.

Another modification may be the activation/deactivation of an adaptive control system (ACS) control feature. If relatively strong turbulences are present in the air impinging on the wind turbine, overloading of the wind power system may occur, as well as overly fatigue of material. If ACS is deactivated, the wind turbine may be shut down to prevent such overload conditions. If ACS is activated, turbulences are detected at the wind turbine, and if these are above a certain threshold, the controller reduces the output power of the wind turbine. Fatigue load on the wind turbine can thereby be reduced. If turbulences in the air flow are reduced again, the output power can be ramped up again to the former value under control of the ACS feature.

Accordingly, it should be clear that for each wind turbine, different operating modes can be set that include different combinations of the respective operating parameters and/or operating features.

In step 707, it is checked if for the candidate operating scheme, a predefined criterion is met. Different possibilities of implementing such criterion are conceivable. For example, the criterion may be that the residual lifetime of all wind turbines exceed a minimum lifetime, for example determined by the de-commissioning date. As another example, the criterion may be that compared to the baseline energy production determined in step 702, a certain increase in the energy production is achieved. As another example, the criterion may be that the energy production (or correspondingly the revenue) is maximized. In an example, the criterion is such that the lifetime of all wind turbines exceed the de-commissioning date, and that the lifetime of wind turbines having excess residual lifetime is reduced (not below the de-commissioning date) by increasing the energy output of the respective wind turbines (i.e., operating the wind turbines more aggressively). Energy production is thus increased at the expense of lifetime of these wind turbines. The lifetimes of all of the plural wind turbines may accordingly be aligned such that the lifetime for example lies within a band above the de-commissioning date, for example within a time span ranging from the de-commissioning date to one, two, three or more years after the de-commissioning date. An aligned lifetime of the plural wind turbines may thereby be achieved, resulting in a correspondingly higher energy production, since all wind turbines can produce until the de-commissioning date and since less fatigue loaded wind turbines can increase the power output.

If the criterion is not met in step 707, the candidate operating scheme is modified in step 708 and steps 706 and 707 are repeated. Such modification can include the above outlined modifications of the operating mode for one or more of the plural wind turbines, or for each of the wind turbines. As mentioned, such modification may take into account a priori knowledge about the effects that a change of a respective operating parameter or operating feature has on the operation of the respective wind turbine and of neighboring or downstream wind turbines.

If the criterion is met in step 707, then the respective candidate operating scheme is selected in step 709 as the operating scheme that achieves the desired operating target, such as lifetime alignment or maximization of energy production. In step 710, the plural wind turbines are then operated with the selected operating scheme, wherein each of the plural wind turbines is operated in accordance with the operating mode specified in the selected operating scheme. The plural wind turbines can thus be operated with an optimized residual lifetime or an optimized energy production/revenue. It should be clear that the method may periodically be repeated, for example after defined periods of time, such as a week, a month, half a year, a year or the like.

Furthermore, it should be clear that the type of optimization illustrated with respect to steps 706 to 708 is only one example, and that other possibilities exist. For example, if the criterion is the maximization of the energy production/revenue, an optimization algorithm may be employed that varies the different possible combinations of operating modes for the plural wind turbines in a plurality of candidate operating schemes and thus finds the candidate operating scheme that results in the highest energy production/revenue or power demand satisfaction. As another example, plural different candidate operating schemes may be provided in step 706, for each of which the wind turbine operation is simulated in step 706, and the resulting total energy production for each of the candidate operating schemes is compared in step 707 to identify the one leading to the maximum energy production. Step 708 may then be omitted in such implementation. Furthermore, if sufficient a priori knowledge is available, the modification made in step 706 to determine the candidate operating scheme may be made such that there is a high likelihood of the criterion being already met in step 707, so that no further steps may be necessary.

In an embodiment, the providing of the candidate operating scheme, the estimating of the residual lifetime and/or of the at least one optimization parameter and the selection of the operating scheme may be performed automatically as part of an iterative process or as part of an optimization process.

Figure 8:
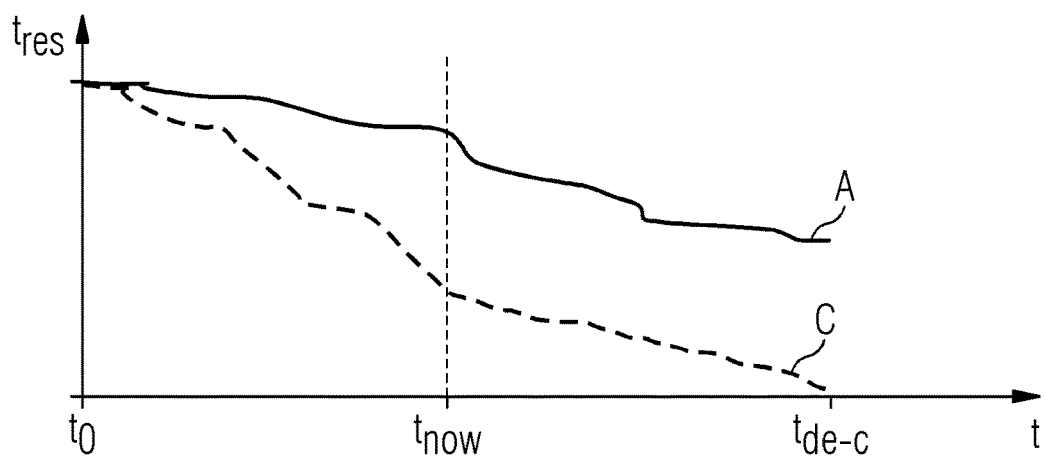
FIG. 8 is a schematic diagram showing the estimated residual lifetime and the estimated energy production of two exemplary wind turbines operated according to an embodiment of the invention.
Figure 8:
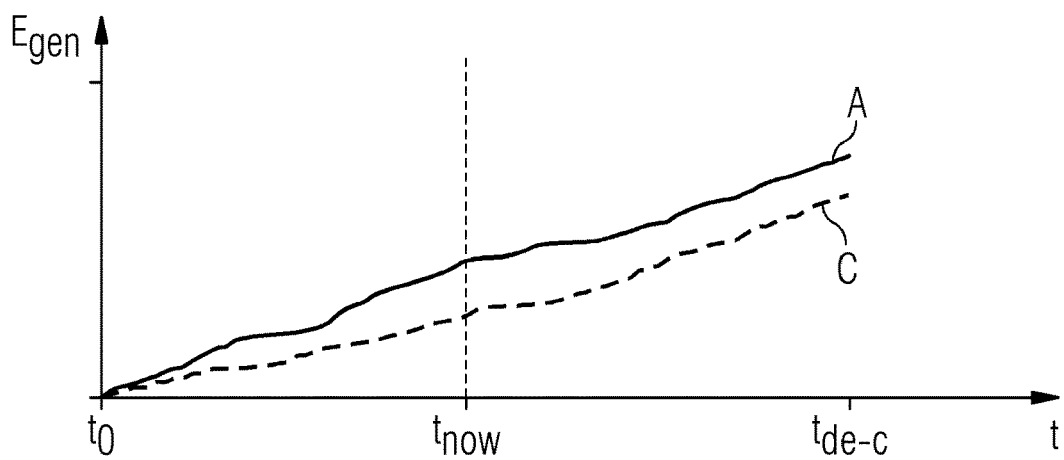

FIG. 8 illustrates the operation of two exemplary wind turbines A and C (see FIG. 4) when the respective method to select an optimized operating scheme is applied in accordance with an embodiment of the invention, employing minimum lifetime criterion and maximum of power output. The upper diagram illustrates the residual lifetime for both wind turbines, which is for wind turbine C extended to the de-commissioning date $t_{de-c}$, which goes at the expense of the residual lifetime of the wind turbine A (please compare to the upper diagram of FIG. 3). On the other hand, as illustrated in the lower diagram, the produced energy $E_{gen}$ is slightly reduced for wind turbine A, but is increased significantly for wind turbine C, in particular since the operation of wind turbine C can now continue up to the de-commissioning date $t_{de-c}$. Such aligned lifetime method accordingly achieves a higher total energy output of the plural wind turbines.

Figure 9:
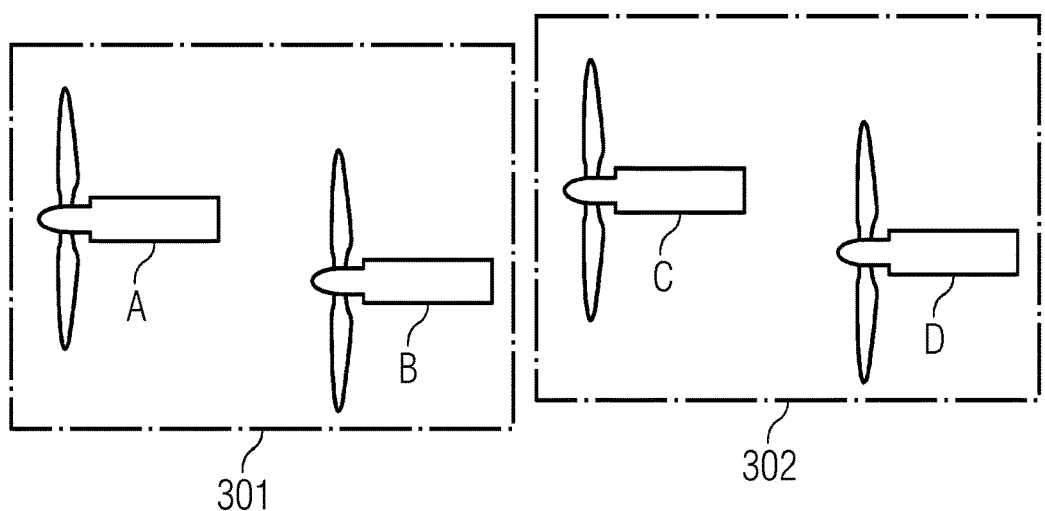
FIG. 9 is a schematic drawing illustrating the control of two groups of wind turbines according to an embodiment of the invention.

In embodiments, the method is not only applicable on a wind turbine level, but also on a wind farm level, as illustrated in FIG. 9. In the example of FIG. 9, wind turbines A and B form part of a first group of wind turbines 301, which may for example be a first wind farm or wind park. Wind turbines C and D form part of a second group of wind turbines 302 which may be a second wind farm or wind park. Wind park 302 is in the wake and is downstream of wind park 301 with respect to a predominant wind direction. Accordingly, wind park 302 experiences the turbulences caused by wind park 301, resulting in respective reduced lifetimes and a decrease in energy production. In accordance with the method of FIG. 7, an operating scheme may be identified for both wind parks that reduces the turbulences experienced by the downstream wind park 302 at the expense of energy production and/or lifetime of the wind turbines of the first wind park 301. Power curtailment may for example be performed for the wind turbines of wind park 301, which can lead to a lifetime and performance (power production) increase for the second wind park 302. Consequently, the overall power production from the two wind parks 301, 302 may be increased. Also in this situation, the operating mode of wind turbine A has an effect on the lifetime and power production of wind turbine C, which is considered in the method of the present application and in particular in the selection of a respective operating scheme in accordance with steps 705 to 709 of FIG. 7 or the described modifications to such method.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling the operation of plural wind turbines, wherein each wind turbine is operable in different operating modes, wherein one or more operating parameters and/or operating features of the wind turbine are set differently in the different operating modes, wherein for at least a first of the plural wind turbines, at least some of the different operating modes in which the first wind turbine is operable have a different impact on a residual lifetime of at least a second of the plural wind turbines, wherein the method comprises:
providing plural different candidate operating schemes, wherein each operating scheme specifies an operating mode for each of the plural wind turbines, wherein at least one of the plural candidate operating schemes includes an operating mode for each of the first and second wind turbines selected such that the lifetime of the second wind turbine is increased at the expense of the lifetime and/or energy production of the first wind turbine,
estimating a residual lifetime and at least one optimization parameter for operation of the plural wind turbines in accordance with the provided candidate operating schemes, wherein estimating the optimization parameter comprises estimating, for a predetermined future period of time, at least one of energy production or revenue generated by operating the plural wind turbines in the candidate operating scheme, and wherein the estimating of the residual lifetime and the optimization parameter considers the impact of the operating mode of the first wind turbine specified in the candidate operating scheme on the residual lifetime of the second wind turbine,
selecting an operating scheme from the plural candidate operating schemes for which the estimated residual lifetime and/or the optimization parameter, respectively, fulfills a predetermined criterion, and
operating the plural wind turbines in accordance with the selected operating scheme.

2. The method according to claim 1, wherein fulfillment of the predetermined criterion includes:
the estimated residual lifetime for each of the plural wind turbines reaches or exceeds a predetermined minimum lifetime, in particular a de-commissioning date for the plural wind turbines;
the estimated optimization parameter is above a predetermined threshold; and/or
the estimated optimization parameter is larger than the optimization parameter estimated for other candidate operating schemes.

3. The method according to claim 1, wherein the method further comprises:
estimating an actual residual lifetime for each of the plural wind turbines;
identifying wind turbines the plural wind turbines for which the estimated actual residual lifetime is lower than a predetermined threshold, or identifying a number of wind turbines of the plural wind turbines having the lowest estimated actual residual lifetime; and
determining one or more of the plural candidate operating schemes by selecting the operating mode of one or more first wind turbines the operation of which has an impact on the lifetime of the identified wind turbines, such that the residual lifetime of the identified wind turbines is increased.

4. The method according to claim 3, wherein the one or more first wind turbines are neighbors to the identified wind turbines and/or are arranged upstream of the identified wind turbines with respect to a predominant wind direction at the location of the first wind turbines.

5. The method according to claim 3, wherein operating modes are selected in the candidate operating scheme for the one or more first wind turbines that reduce wind turbulences at the identified wind turbines.

6. The method according to claim 1, wherein the selected operating scheme includes an operating mode for each of the first and second wind turbines selected such that the lifetime of the second wind turbine is increased at the expense of the lifetime and/or energy production of the first wind turbine.

7. The method according to claim 1, wherein the second wind turbine is positioned in the wake of the first wind turbine.

8. The method according to claim 1, wherein the predetermined period of time is a period of time until the de-commissioning of at least one of the first and second wind turbines.

9. The method according to claim 1, wherein the operating mode for a wind turbine determines:
activation state of a peak shaving operating feature, the activation of which changes an operating curve using which a wind turbine controller operates the wind turbine, the operating curve determining wind turbine settings, in particular rotor speed and pitch, in dependence on wind speed;
curtailment of the power output of the wind turbine;
activation state of a wake steering operating feature;
an operating parameter of a wake steering operating feature;
activation state and/or operating parameters of a power boost operating feature, the activation of which increases the power output of the wind turbine by increasing the power limit of the wind turbine under predetermined wind conditions;
activation state of a high wind ride through, HWRT, operating feature the activation of which performs a load based reduction of the output power of the wind turbine in predetermined wind conditions;
activation state of a power curve upgrade kit, PCUK, control feature, the activation of which modifies a control function of a wind turbine controller, in particular the pitch angle control, in dependence on hardware modifications installed on the wind turbine, in particular on rotor blades thereof; and/or
activation state of an adaptive control system, ACS, control feature that reduces the output power of the wind turbine if turbulences above a threshold are determined at the wind turbine.

10. The method according to claim 1, wherein the residual lifetime and the optimization parameter are estimated for each of the plural different candidate operating schemes.

11. The method according to claim 1, wherein at least one of the plural candidate operating schemes is determined based on a priori knowledge on the impact of operating modes of the first wind turbine on the lifetime of the second wind turbine.

12. The method according to claim 1, wherein the estimating of the residual lifetime and/or the optimization parameter is performed repeatedly for the plural different candidate operating schemes, wherein the candidate operating scheme is selected for which the optimization parameter reaches the highest value.

13. The method according to claim 1, wherein the estimation of a residual lifetime is performed on a component level for different components of the respective wind turbine.

14. A control system for controlling the operation of plural wind turbines, wherein each wind turbine is operable in different operating modes under control of the control system, wherein one or more operating parameters and/or operating features of the wind turbine are set differently in the different operating modes, wherein for at least a first of the plural wind turbines at least some of the different operating modes in which the first wind turbine is operable have a different impact on a residual lifetime of at least a second of the plural wind turbines, wherein the control system comprises a processing unit and a memory, the memory storing control instructions which when executed by the processing unit of the control system, perform a method including:
providing plural different candidate operating schemes, wherein each operating scheme specifies an operating mode for each of the plural wind turbines, wherein at least one of the plural candidate operating schemes includes an operating mode for each of the first and second wind turbines selected such that the lifetime of the second wind turbine is increased at the expense of the lifetime and/or energy production of the first wind turbine,
estimating a residual lifetime and at least one optimization parameter for operation of the plural wind turbines in accordance with the provided candidate operating schemes, wherein estimating the optimization parameter comprises estimating, for a predetermined future period of time, at least one of energy production or revenue generated by operating the plural wind turbines in the candidate operating scheme, and wherein the estimating of the residual lifetime and the optimization parameter considers the impact of the operating mode of the first wind turbine specified in the candidate operating scheme on the residual lifetime of the second wind turbine,
selecting an operating scheme from the plural candidate operating schemes for which the estimated residual lifetime and/or the optimization parameter, respectively, fulfills a predetermined criterion, and
operating the plural wind turbines in accordance with the selected operating scheme.

15. A computer program product comprising a computer readable hardware storage device having computer readable program stored therein, said program code executable by a processor of a computer system to implement a method for controlling the operation of plural wind turbines, the method including:
providing plural different candidate operating schemes, wherein each operating scheme specifies an operating mode for each of the plural wind turbines, wherein at least one of the plural candidate operating schemes includes an operating mode for each of the first and second wind turbines selected such that the lifetime of the second wind turbine is increased at the expense of the lifetime and/or energy production of the first wind turbine,
estimating a residual lifetime and at least one optimization parameter for operation of the plural wind turbines in accordance with the provided candidate operating schemes, wherein estimating the optimization parameter comprises estimating, for a predetermined future period of time, at least one of energy production or revenue generated by operating the plural wind turbines in the candidate operating scheme, and wherein the estimating of the residual lifetime and the optimization parameter considers the impact of the operating mode of the first wind turbine specified in the candidate operating scheme on the residual lifetime of the second wind turbine,
selecting an operating scheme from the plural candidate operating schemes for which the estimated residual lifetime and/or the optimization parameter, respectively, fulfills a predetermined criterion, and
operating the plural wind turbines in accordance with the selected operating scheme.

* * * * *